(12) United States Patent
Baun et al.

(10) Patent No.: US 10,697,434 B2
(45) Date of Patent: Jun. 30, 2020

(54) METHOD FOR LIFTING A COMPONENT OF A MULTIROTOR WIND TURBINE

(71) Applicant: Vestas Wind Systems A/S, Aarhus N. (DK)

(72) Inventors: Torben Ladegaard Baun, Skødstrup (DK); Gunnar K. Storgaard Pedersen, Skjern (DK); Ivar J. B. K. Jensen, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 53 days.

(21) Appl. No.: 16/090,683

(22) PCT Filed: Apr. 27, 2017

(86) PCT No.: PCT/DK2017/050124
§ 371 (c)(1),
(2) Date: Oct. 2, 2018

(87) PCT Pub. No.: WO2017/186243
PCT Pub. Date: Nov. 2, 2017

(65) Prior Publication Data
US 2019/0120210 A1    Apr. 25, 2019

(30) Foreign Application Priority Data
Apr. 29, 2016  (DK) .................. 2016 70279

(51) Int. Cl.
*F03D 13/10* (2016.01)
*F03D 1/02* (2006.01)

(52) U.S. Cl.
CPC .............. *F03D 13/10* (2016.05); *F03D 1/02* (2013.01); *F05B 2230/61* (2013.01); *Y02E 10/72* (2013.01); *Y02P 70/523* (2015.11)

(58) Field of Classification Search
CPC ......... F03D 13/10; F03D 1/02; F05B 2230/61
See application file for complete search history.

(56) References Cited

U.S. PATENT DOCUMENTS

| 2010/0005656 A1 | 1/2010 | Vangsy |
| 2012/0228881 A1 | 9/2012 | Siegfriedsen |
| 2016/0069321 A1 | 3/2016 | Neumann et al. |

FOREIGN PATENT DOCUMENTS

| CN | 1198509 A | 11/1998 |
| CN | 101737259 A | 6/2010 |

(Continued)

OTHER PUBLICATIONS

European Patent Office, International Search Report and Written Opinion in PCT Application No. PCT/DK2017/050124, dated Jul. 31, 2017.

(Continued)

*Primary Examiner* — Lee A Holly
(74) *Attorney, Agent, or Firm* — Wood Herron & Evans LLP

(57) ABSTRACT

The invention relates to a method for lifting a component (1a, 1b) of a multirotor wind turbine (100) from an initial position to an operating position. The initial position is near a base (2a) of a tower structure (2) of the wind turbine (100) while the operating position is arranged at a distance from the tower structure (2), on a load carrying structure (3) connected to the tower structure (2) and extending away from the tower structure (2). By operating a first hoisting mechanism provided at or near a connecting point between the tower structure (2) and a load carrying structure (3), and a second hoisting mechanism provided at or near the operating position, the component (1a, 1b) is moved from the initial position to the operating position along a predeter- (Continued)

mined path. The component (1*a*, 1*b*) is finally mounted on the load carrying structure (3) at the operating position.

8 Claims, 6 Drawing Sheets

(56) References Cited

FOREIGN PATENT DOCUMENTS

| | | |
|---|---|---|
| FR | 2919903 A1 | 2/2009 |
| GB | 2443886 A | 5/2008 |

OTHER PUBLICATIONS

Danish Patent and Trademark Office, Examination Report in PA 201670279, dated Nov. 11, 2016.

METHOD FOR LIFTING A COMPONENT OF A MULTIROTOR WIND TURBINE

FIELD OF THE INVENTION

The present invention relates to a method for lifting a component of a multirotor wind turbine from an initial position, which is, according to the invention, at or near a base of a tower structure. The method allows lifting of the component to an operating position on a load carrying structure of the multirotor wind turbine.

BACKGROUND OF THE INVENTION

Wind turbines normally comprise one or more energy generating units, each energy generating unit comprising a rotor comprising a hub carrying one or more wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, energy generating unit. Such wind turbines are sometimes referred to as 'multirotor wind turbines'.

In multirotor wind turbines the energy generating units may be carried by one or more load carrying structures which are, in turn, connected to a tower structure. Thereby at least some of the energy generating units are not mounted directly on the tower structure, and they may be positioned at a large distance away from the tower structure.

GB 2 443 886 A discloses a multirotor wind turbine comprising a tower and at least two arms projecting outwards there from. A rotor is attached to an end of each arm. The rotors can be hoisted to or lowered from the arms along a substantially vertical direction.

DESCRIPTION OF THE INVENTION

It is an object of embodiments of the invention to provide a method for lifting a component of a multirotor wind turbine, in which the component is lifted from an initial position to an operating position along a desired path.

It is a further object of embodiments of the invention to provide a method for lifting a component of a multirotor wind turbine, in which only a small area around the multirotor wind turbine needs to be suitable for receiving the component.

The invention provides a method for lifting a component of a multirotor wind turbine from an initial position to an operating position, the multirotor wind turbine comprising a tower structure and at least one load carrying structure being arranged for carrying at least one energy generating unit and for being connected to the tower structure, each load carrying structure extending away from the tower structure, the method comprising the steps of:

positioning the component at an initial position near a base of the tower structure, providing a first hoisting mechanism at or near a connecting point between the tower structure and a load carrying structure, providing a second hoisting mechanism at or near an operating position for the component, said operating position being arranged on the load carrying structure at a distance from the tower structure, operating the first hoisting mechanism and the second hoisting mechanism in such a manner that the component is moved from the initial position to the operating position along a predetermined path, and mounting the component on the load carrying structure at the operating position.

The present invention relates to a method for lifting a component of a multirotor wind turbine. In the present context the term "lifting" should be interpreted as raising the component to a higher position compared to an initial level. The initial level may be the ground level, sea level, a level defined by a platform suitable for multirotor wind turbine, or any other suitable level where the component may be positioned prior to performing the method.

The component could be any kind of element which is to be lifted and to form a part of the multirotor wind turbine. This will be described in further detail below.

In the present context the term "multirotor wind turbine" should be interpreted to mean a wind turbine which comprises two or more energy generating units, each energy generating unit comprising a rotor.

The initial position is to be interpreted as a starting position of the component. The component is to be placed at its initial position at the beginning of a lifting procedure. The initial position is at or near a base of the tower structure. From this initial position the component is to be moved to another position which is at a higher vertical level than the initial position.

The operating position is to be interpreted as a position of the component where the component is arranged during the operation of the wind turbine. Once the component is in the operating position it may become an integral part of the multirotor wind turbine. It may be a final position of the component. The operating position is arranged at a higher level than the initial position.

In the present context the term "tower structure" should be interpreted to mean a substantially vertical structure, arranged to carry the energy generating units of the multirotor wind turbine, at least partly via one or more load carrying structures. The tower structure is preferably anchored, at a lower part, to a foundation structure, defining a base of the tower structure. It is not ruled out that one or more energy generating units are mounted directly on the tower structure.

The load carrying structure is arranged for carrying at least one energy generating unit, and for being connected to the tower structure of the multirotor wind turbine. Accordingly, the load carrying structure forms a connection between the energy generating unit and the tower structure, and is capable of handling the loads involved with carrying the energy generating units. The load carrying structure is connected to the tower structure at one end, and extends away from the tower structure, all the way to its free end.

In the present context the term "energy generating unit" should be interpreted to mean a part of the wind turbine which actually transforms the energy of the wind into electrical energy. Each energy generating unit thereby typically comprises a rotor, carrying a set of wind turbine blades, and a generator. The energy generating unit may further comprise a gear arrangement interconnecting the rotor and the generator. The generator, and possibly the gear arrangement, may be arranged inside a nacelle.

According to the method of the invention, a component is initially positioned at an initial position near a base of the tower structure. Accordingly, the component is initially positioned in a region close to the tower structure. This position is much closer to the base of the tower structure than to a point which is a vertical projection of the free end of the load carrying structure to a plane of the tower structure base. Accordingly, only a relatively small area around the base of the tower structure needs to be suitable for positioning a component to be lifted to the multirotor wind turbine. In the case that the multirotor wind turbine is an offshore wind turbine, the energy generating unit could, e.g., be arranged on an access platform mounted on the tower structure near the sea level. In the case that the multirotor wind turbine is an onshore wind turbine, only a small area around the wind turbine needs to be prepared for receiving a component. For instance, in order to be suitable for having a component positioned thereon, the ground must be stabilized and possible trees must be cut down. Furthermore, the landscape must be suitable for the purpose, e.g. not containing steep slopes, etc. It is an advantage that only a small area around the tower structure of the multirotor wind turbine needs to fulfil these requirements. However, by applying the method of the invention, it is still possible to hoist the component to an operating position on a transversal load carrying structure, the operating position being displaced relative to a centre axis of the tower structure.

Next, a first hoisting mechanism is provided at or near a connecting point between the tower structure and a load carrying structure. Furthermore, a second hoisting mechanism is provided at or near the operating position for the component. Accordingly, the second hoisting mechanism is arranged on the load carrying structure at or near the position where the component is to be mounted.

In the present context, a hoisting mechanism is to be understood as a mechanism for lifting and/or lowering a component. Accordingly, the component can be lifted to the operating position by means of the hoisting mechanisms, and without the need for an external crane. Furthermore, an external crane may only be required for erecting the tower structure. This reduces the costs of erecting the wind turbine.

The operating position is arranged on the load carrying structure at a distance from the tower structure. In a present context, the distance from the tower structure is to be interpreted as any position on the load carrying structure between the first end and the second end of the load carrying structure along a horizontal direction. When positioned at the distance from the tower structure the component creates a load with a centre of gravity which is displaced with respect to a tower structure.

Next, each of the first and second hoisting mechanism is operated in such a manner that the component is moved from the initial position to the operating position along a predetermined path. The predetermined path is further determined by the initial position, a position of the first and second hoisting mechanisms, and coordination between the first and second hoisting mechanisms. The predetermined path can be arbitrarily chosen, e.g. in order to match various requirements dictated by the site, the load handling capability of the tower structure and/or the load carrying structures, etc. For instance, it may be necessary to lift the component above one or more obstacles, such as trees, buildings, etc., in the vicinity of the multirotor wind turbine. The selected path can then be followed by appropriately operating the first and second hoisting mechanisms. As another example, the component may be lifted by the first hoisting mechanism by keeping it close to the tower structure in order to keep the balance of the entire multirotor wind turbine. Then only when the component is close to the top of the tower structure the second mechanism may pull the component in the horizontal direction and towards the operating position. Thereby the loads introduced into the load carrying structure and the tower structure during lifting of the component can be minimised.

Finally, the component is mounted on the load carrying structure at the operating position. By mounting the component to the multirotor wind turbine, the component becomes an integral part of the wind turbine.

It should be noted that the entire process of lifting a component described above may be reversed and therefore may serve as a process for lowering a component from an operating position to a position which is at a lower vertical level than the operating position. This may, e.g., be relevant in the case that a component needs to be replaced, during maintenance on a component or in the case that the wind turbine needs to be dismantled.

The described method enables a lifting of a multirotor wind turbine component from a position which is near a base of a wind turbine tower structure. When the multirotor wind turbine component is near the base only a small area around the multirotor wind turbine needs to be suitable for receiving the component. Furthermore, due to the hoisting mechanisms arranged at the multirotor wind turbine, the component can be hoisted along any arbitrarily determined path. It is an advantage to have a possibility of choosing any path for hoisting a component of the multirotor wind turbine because, in that case, there is no need to clear a large area around the wind turbine in order to lift a component. There is no need to, for instance, cut down trees in the entire area of the multirotor wind turbine. Furthermore, the component can be kept close to the tower structure during hoisting and in that way keep the multirotor wind turbine balanced. When the multirotor wind turbine is offshore, there is no need for any additional barge or the like since the component may be lifted from an already existing platform surrounding the tower structure. However, it is still possible to lift the component to an operating position which is displaced relative to a centre axis of the tower structure. This is obtained by appropriately operating the first and second hoisting mechanisms.

The component may be or form part of an energy generating unit. For instance, the component may be an entire energy generating unit, or it may be one or more parts of an energy generating unit, i.e. it may be a nacelle, a hub, a rotor, a rotor carrying one or more wind turbine blades, a wind turbine blade, a gear arrangement, a generator or a combination thereof.

In one embodiment of the invention, the operating position may be arranged at or near the free end of the load carrying structure. In this case, the component is mounted in a position which is as far away from the tower structure as possible. As an alternative, the operating position may be at another position along the load carrying structure, between the first end and the second, free end. It is not ruled out that a single load carrying structure may carry two or more energy generating units, mounted at various positions along the load carrying structure.

According to one embodiment of the invention, the step of operating the first hoisting mechanism and the second hoisting mechanism may comprise decreasing a pull provided by the first hoisting mechanism and increasing a pull provided by the second hoisting mechanism during the hoisting of the component. In this manner the path along which the component is hoisted may be defined. For example, by initially operating only or mainly the first hoisting mechanism the pull provided thereof will lift the component along a substantially vertical direction, i.e.

mainly parallel to the tower structure. After the component has been lifted to a certain height, the pull provided by the first hoisting mechanism may be gradually decreased while the pull provided by the second hoisting mechanism is gradually increasing. In this manner, the component may be gradually lifted towards the top of the tower structure and simultaneously along a horizontal direction towards the second hoisting mechanism, i.e. towards the operating position thereof. In this manner the component may be lifted over various surrounding obstacles which can be avoided. Furthermore, when the component is close to the tower structure, the tower structure may shield the component from the wind during most of the hoisting.

According to one embodiment of the invention, at least two components may be lifted substantially simultaneously to operating positions on load carrying structures arranged on opposite sides of the tower structure. In this embodiment, at least two components are initially positioned near a base of the tower structure, each component being on the opposite sides of the tower structure. Further, at least two first hoisting mechanisms may be provided at or near a connecting point between the tower structure and a respective load carrying structure, and at least two second hoisting mechanisms are also provided at the operating positions on the respective load carrying structures. In this embodiment, all hoisting mechanisms may be operated simultaneously and synchronously. Thereby loads introduced in the tower structure and/or the load carrying structures during the hoisting of the components can be balanced, without requiring a separate counter balance. This reduces the costs involved with erecting the wind turbine, as well as the time required in order to erect the wind turbine. The at least two first hoisting mechanisms and the at least two second hoisting mechanisms may be operated in such a manner that the components are moved from the initial positions to the operating positions along predetermined paths. The components may also be simultaneously mounted at their operating positions, on the load carrying structures arranged on the opposite sides of the tower structures.

The method may further comprise the step of mounting a wire between an operating position of at least one load carrying structure and a position on the tower structure at or near the base of the tower structure. In this case, the step of mounting a wire is preferably performed prior to the step of operating the first hoisting mechanism and the second hoisting mechanism. In this embodiment, the wire may provide a counter balance, stabilizing the tower structure, in the case when only one component, typically being heavy, is to be lifted to the operating position. Alternatively or additionally, in the case that two components are lifted simultaneously, as described above, the wire may provide an additional safety mechanism. In this case, if one of the wires interconnecting a component and a hoisting mechanism breaks during the lifting process, an uneven load will abruptly be applied to the tower structure. However, mounting a wire as described above will counteract this uneven load, thereby preventing damage to the tower structure. Furthermore, the wire may serve as a guide for the component during at least part of the lifting process. In this case, at least part of the predetermined path is determined by the position of the wire.

As an alternative, the tower structure may be provided with guy wires extending between a position on the tower structure and an anchor block arranged on the ground at a distance from the tower structure. Such guy wires may also provide the required counter balance as well as stability to the tower structure.

In one embodiment of the invention, the first hoisting mechanism and/or the second hoisting mechanism may comprise a winch. This winch may be operated in such a way that a pull provided by the winch of the first hoisting mechanism may decrease while a pull provided by the winch of the second hoisting mechanism is increasing during the hoisting of the component. At least one winch may be arranged at the position of the first or the second hoisting mechanism. As an alternative, at least one winch may be arranged in another position, e.g. on the ground, and be connected to a pulley arranged at the position of the first or second hoisting mechanism, e.g. via a wire or the like.

Alternatively, the first hoisting mechanism and/or the second hoisting mechanism may comprise a motor mechanism, a hydraulic mechanism, may be driven electrically, pneumatically or even manually. The hoisting mechanism may further comprise one or more chains, fibres, wires, ropes, or the like, serving as a lifting medium. As yet another alternative, a winch may form part of the first hoisting mechanism and the second hoisting mechanism may comprise a pulley, and the winch and pulley may be connected via a wire, rope or the like.

In yet another embodiment of the invention, the predetermined path may extend initially along a substantially vertical direction, from the initial position, and subsequently increasingly along a horizontal direction, towards the operating position. Namely, in order to obtain that the component is hoisted from the initial position near the base of the tower structure to the operating position, the component may initially be moved along a substantially vertical direction parallel to the tower structure by primarily operating the first hoisting mechanism. Subsequently, a pull provided by the first hoisting mechanism may be gradually decreased while a pull provided by the second hoisting mechanism is gradually increased. Thereby the component follows a path which is increasingly along a substantially horizontal direction perpendicular to the tower structure.

BRIEF DESCRIPTION OF THE DRAWINGS

The invention will now be described in further detail with reference to the accompanying drawings in which.

DETAILED DESCRIPTION OF THE DRAWINGS

FIGS. 1-4 illustrate lifting of a component 1*a* of a multirotor wind turbine 100 according to a first embodiment of the invention.

Figure 1:
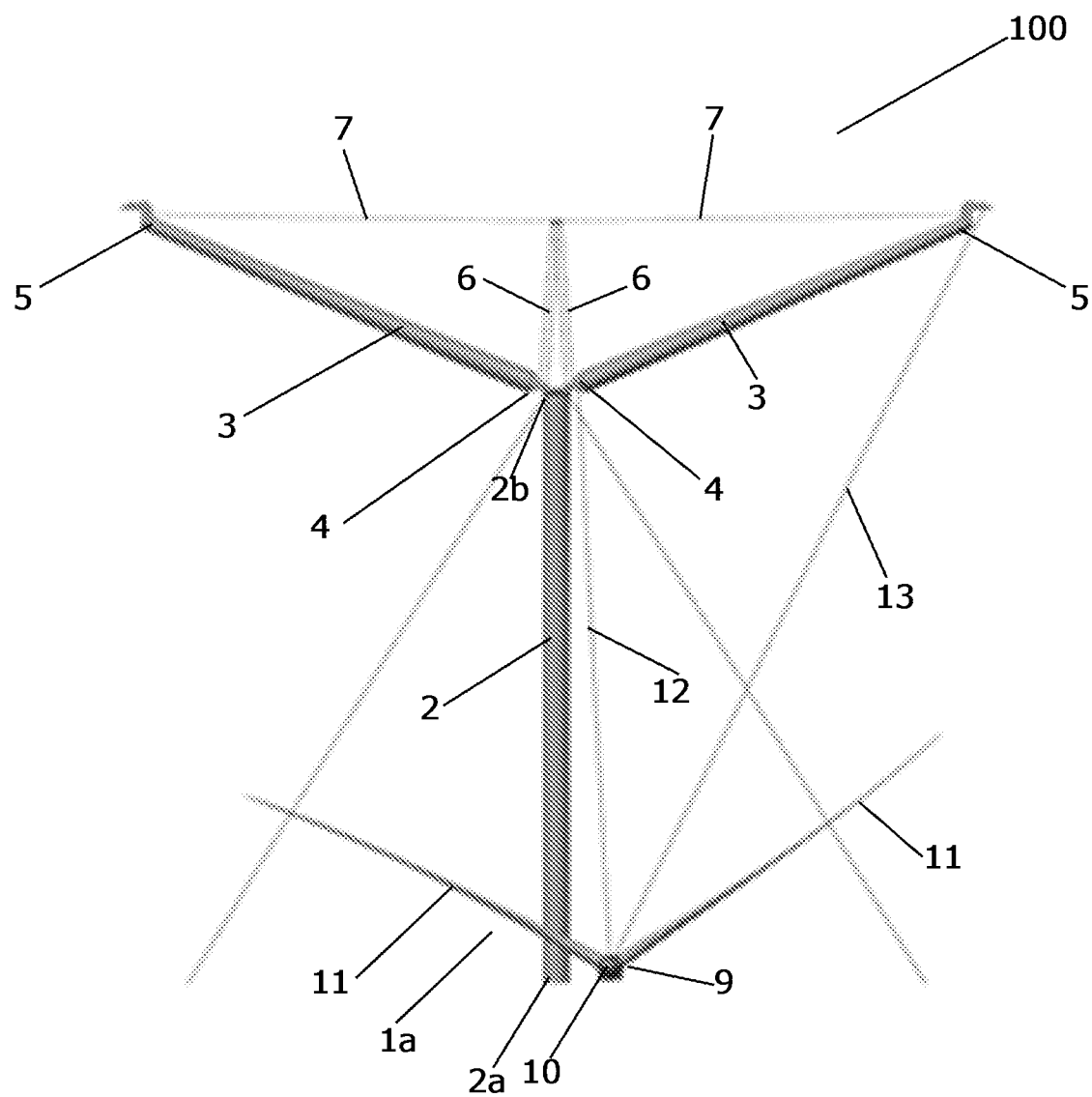
FIGS. 1-4 illustrate a multirotor wind turbine during various steps of a method for lifting a component of a multirotor wind turbine from an initial position to an operating position according to a first embodiment of the invention.

FIG. 1 is a front view of a multirotor wind turbine 100 with a component 1*a* to be lifted. The multirotor wind turbine 100 comprises a tower structure 2 and two load carrying structures 3. A first end 4 of each load carrying structure 3 is mounted on the tower structure 2, near the top 2*b* of the tower structure 2. As illustrated in the drawings, each load carrying structure may include an elongate beam. In FIG. 1, each of the load carrying structures 3 extends away from the tower structure 2 along an upwardly inclined direction, i.e. in such a manner that a free end 5 of each load carrying structure 3 is arranged at a distance from the tower structure 2, and at a higher vertical level than a connection point between the first end 4 of the load carrying structure 3 and the top 2b of the tower structure 2. Each load carrying structure 3 comprises a secondary structure 6, extending from the first end 4 of the load carrying structure 3 in an upwards direction. A wire 7 interconnects the secondary structure 6 of each load carrying structure 3 to the free end 5 of the load carrying structure 3. The two secondary structures 6 are fixed to each other, e.g. by means of bolts, thereby fixing the load carrying structures 3 in the upwardly inclined direction.

In FIG. 1 the component 1a is arranged in an initial position near the base 2a of the tower structure 2. The component 1a comprises a nacelle 9, carrying a rotor 10, and two wind turbine blades 11 being mounted on the rotor 10. The wind turbine blades 11 are pointing in an upwards direction. This is sometimes referred to as a "bunny ear configuration". In another embodiment the component may be only a nacelle 9, and/or one wind turbine blade, and/or a rotor, or an entire energy generating unit.

The component 1a is connected to a first hoisting mechanism (not shown) arranged at or near the connection point, i.e. the first end 4 of one of the load carrying structures 3, via a first wire 12. The component 1a is further connected to a second hoisting mechanism (not shown) arranged near the free end 5 of the load carrying structure 3, via a second wire 13. Thereby the component 1a can be hoisted from the initial position illustrated in FIG. 1 to an operating position on the load carrying structure 3 by appropriately operating the first and second hoisting mechanisms. The operating position is at or near the free end 5 of the load carrying structure.

Figure 2:
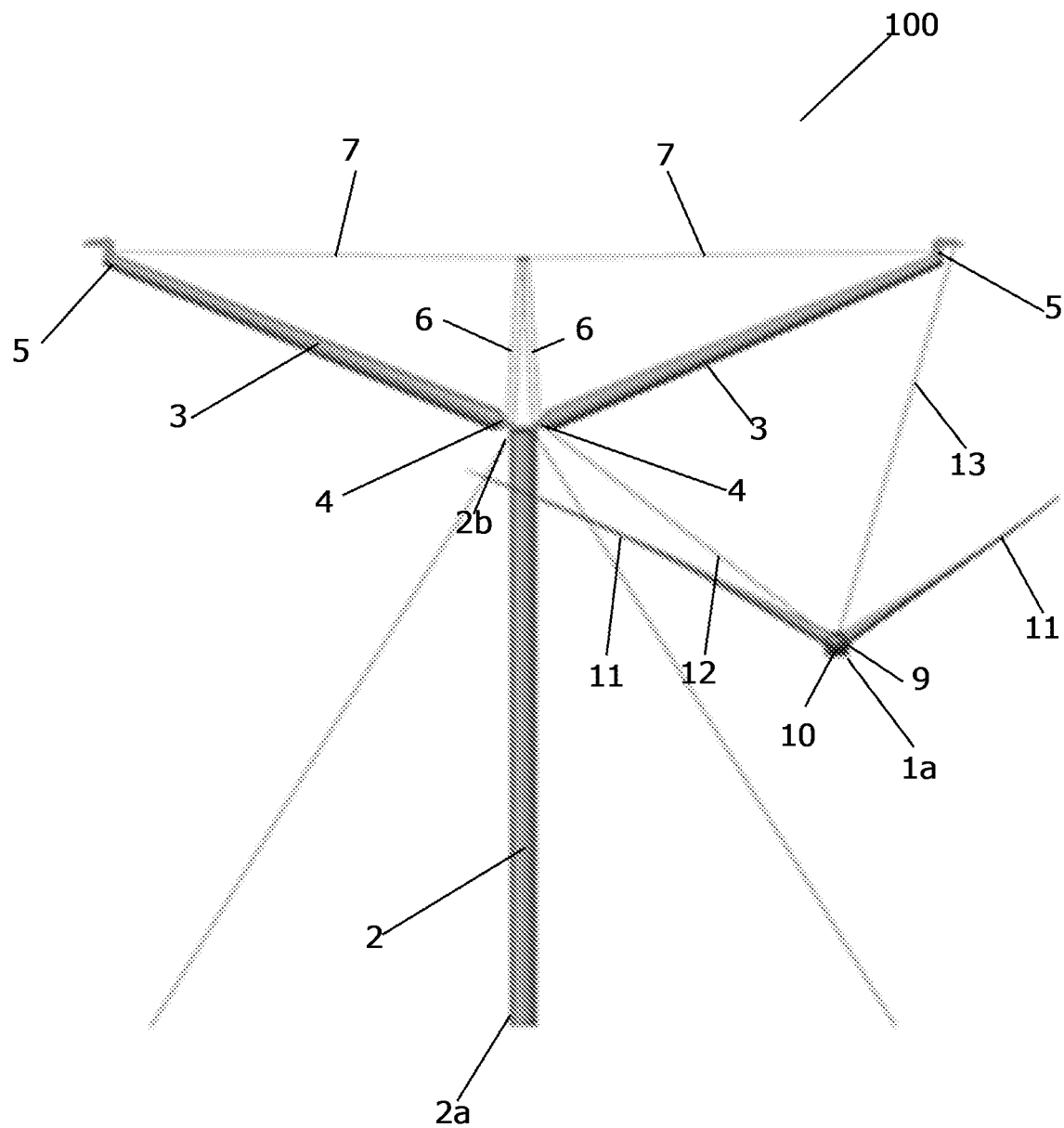

In FIG. 2, the hoisting mechanisms are being operated, and the component 1a is in the process of being hoisted from the initial position illustrated in FIG. 1 towards the operating position on the load carrying structure 3. The first and/or second hoisting mechanism may comprise a winch which is/are operated in such a way that a pull provided by the winch of the first hoisting mechanism is decreasing while a pull provided by the winch of the second hoisting mechanism is increasing during the hoisting of the component 1a.

Figure 3:
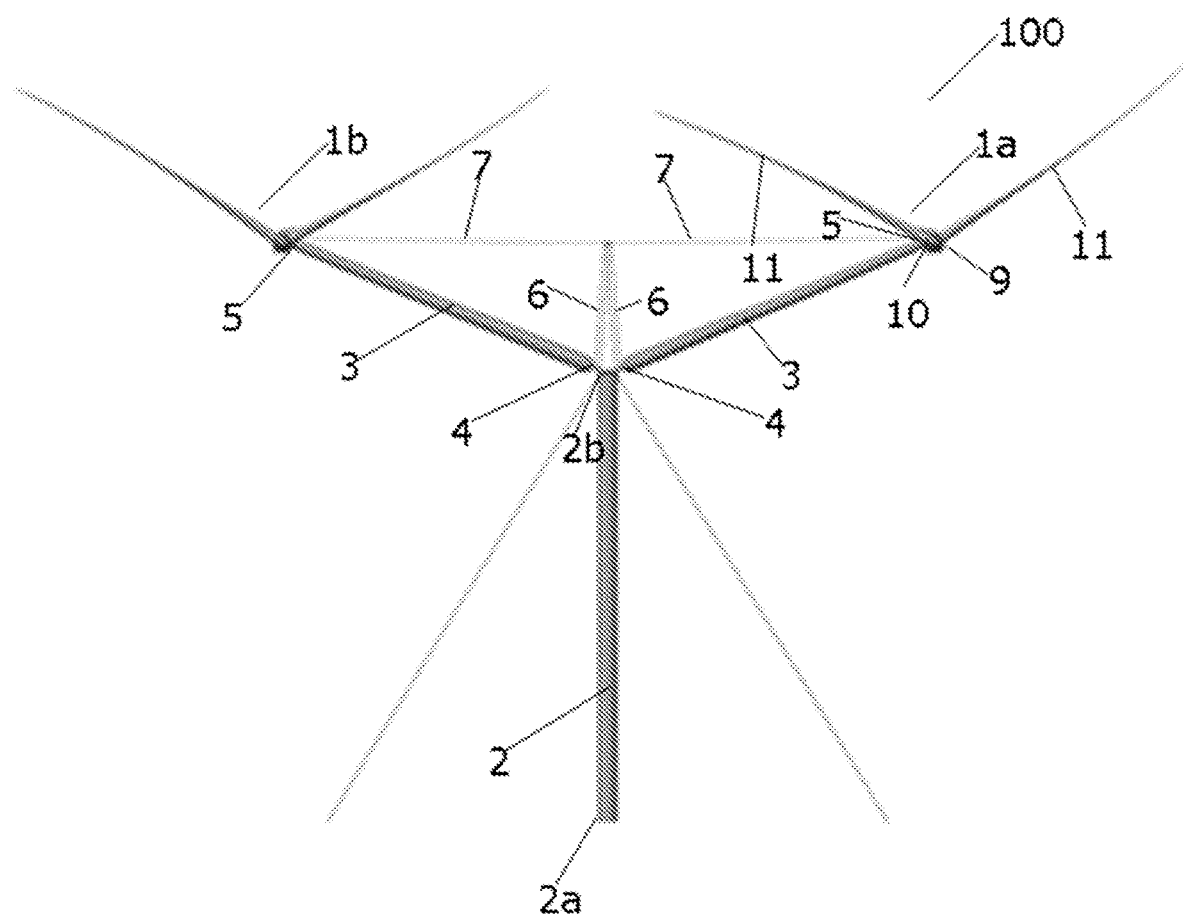

In FIG. 3, the hoisting of the component 1a has been completed, and it has been mounted at the operating position at the free end 5 of the load carrying structure 3. Furthermore, an additional component 1b has been mounted on the other load carrying structure 3, essentially as described above and illustrated in FIGS. 1 and 2.

Figure 4:
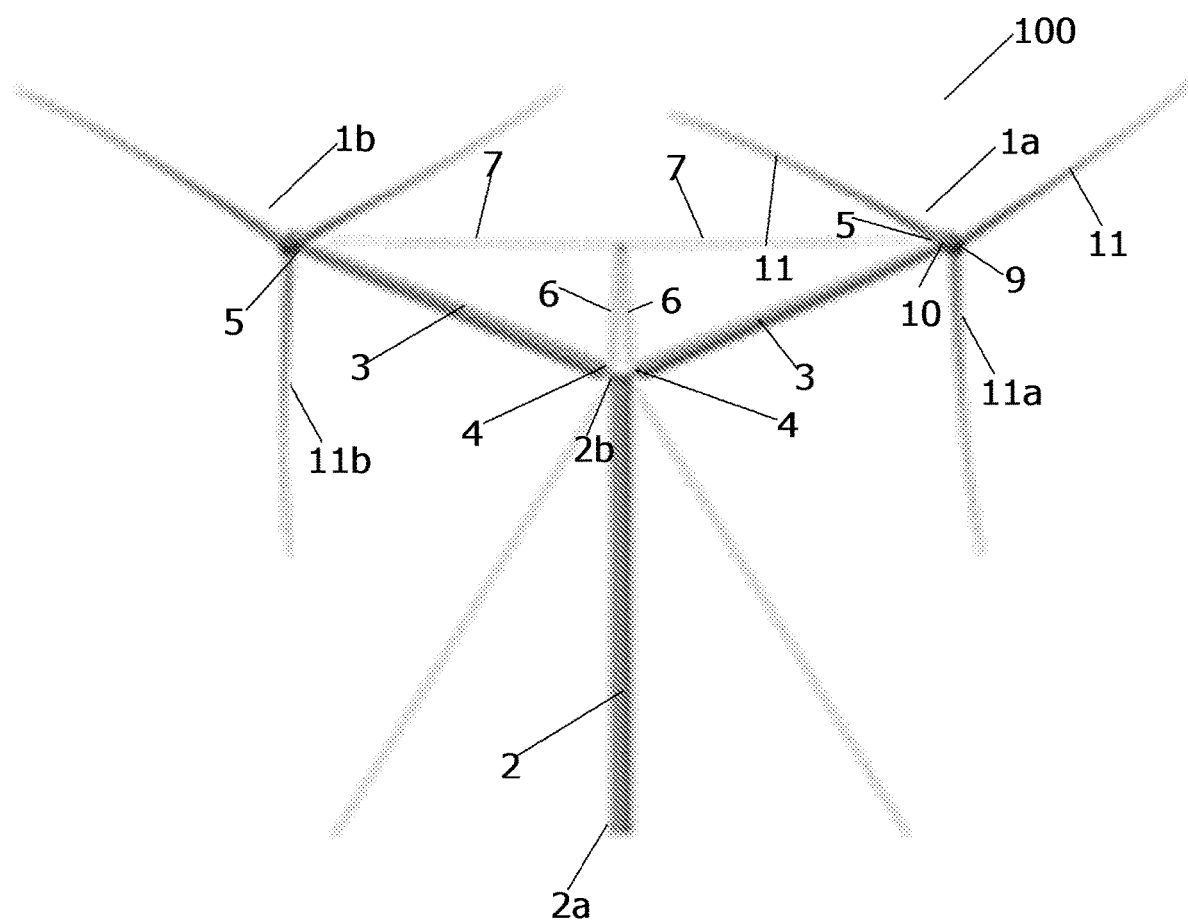

In FIG. 4 a third wind turbine blade 11a, 11b has further been mounted on the rotors 10 of each of the components 1a and 1b. The third wind turbine blades 11a, 11b may, e.g., have been lifted from the initial position near the base 2a of the tower structure 2 to the rotors 10, using the first and second hoisting mechanisms, and essentially in the manner described above and illustrated in FIGS. 1 and 2.

Figure 5:
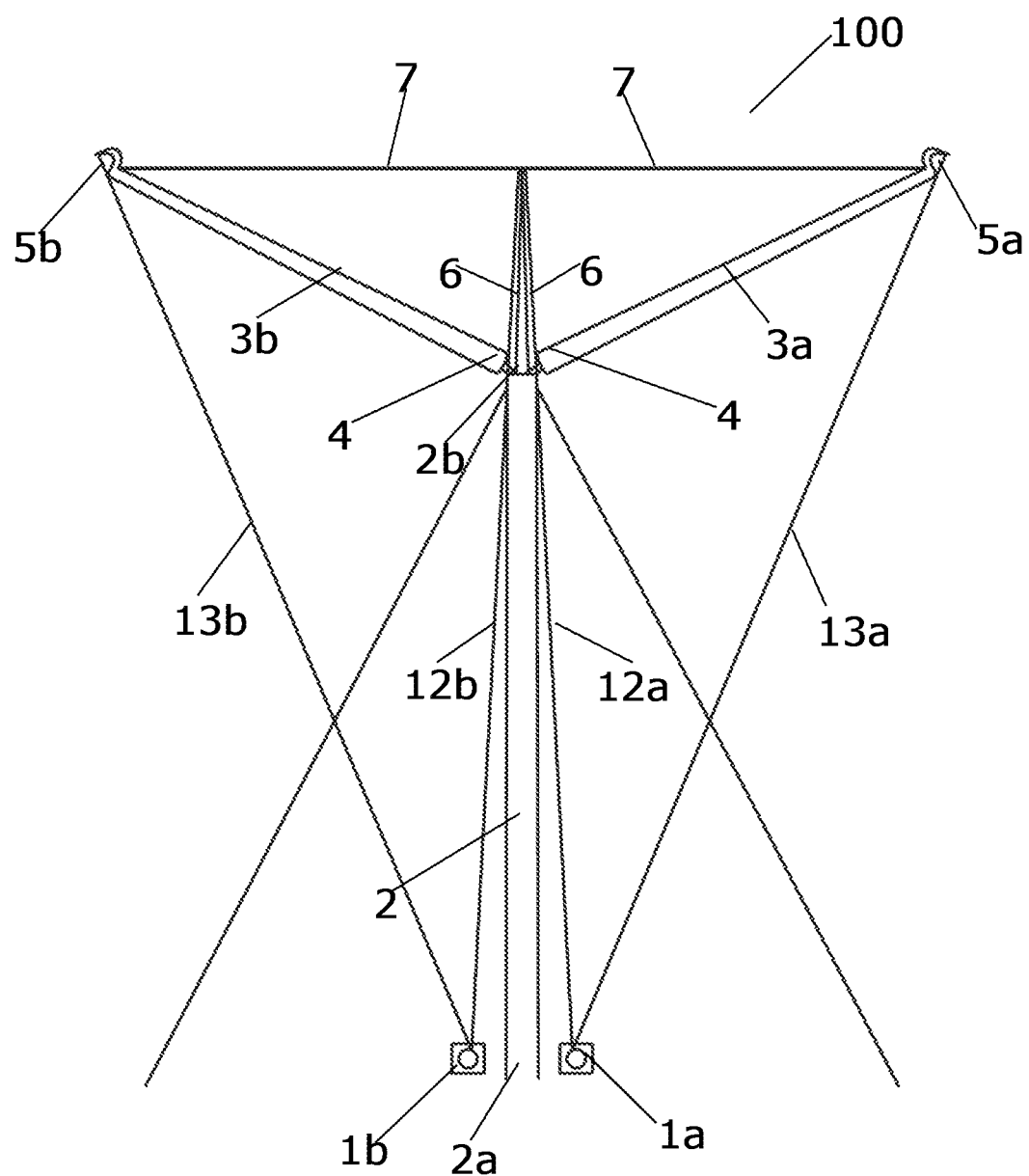
FIGS. 5 and 6 illustrate a multirotor wind turbine during various steps of a method for lifting a component of a multirotor wind turbine from an initial position to an operating position according to a second embodiment of the invention.
Figure 6:
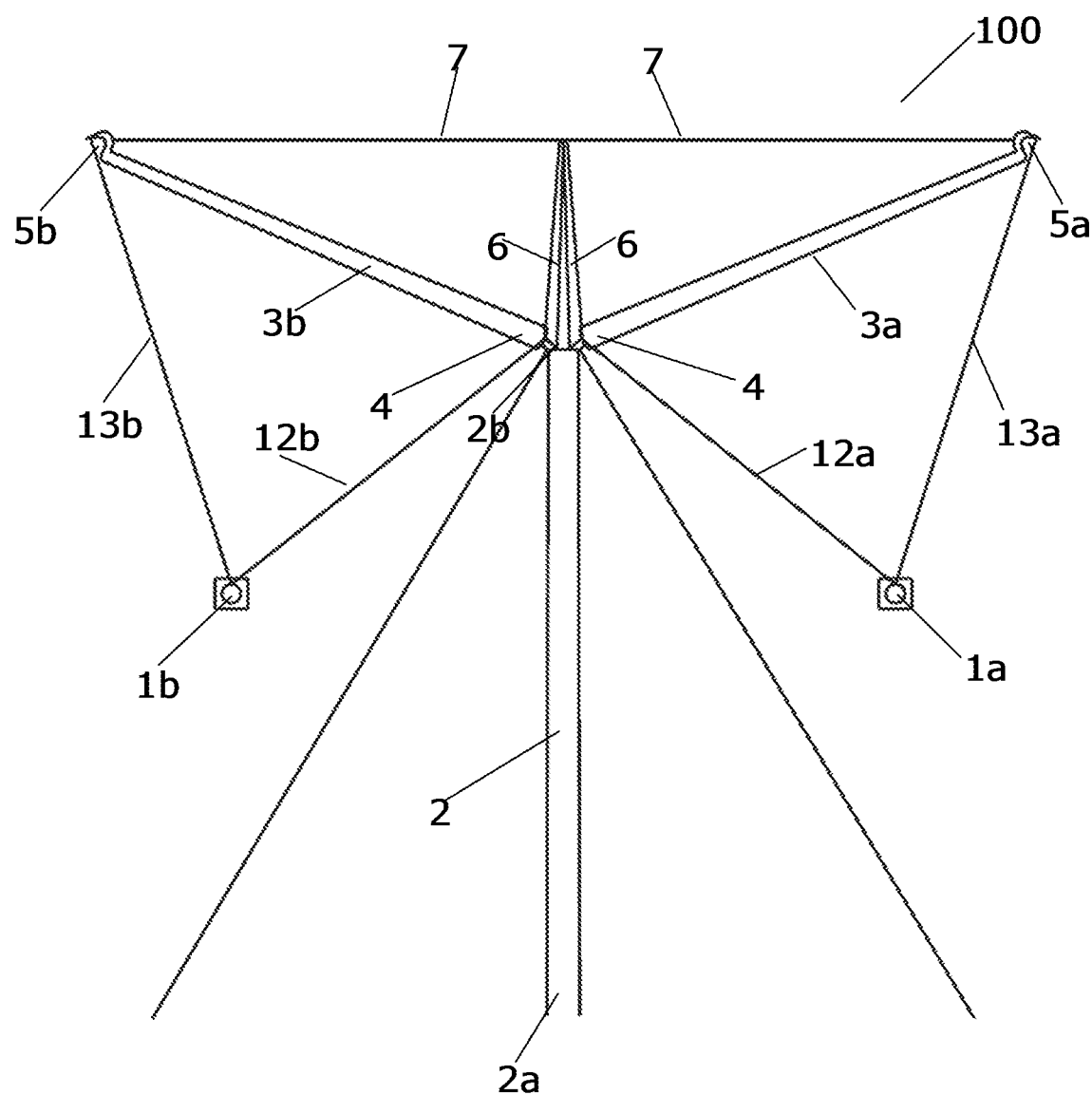

FIGS. 5 and 6 illustrate simultaneous lifting of two components 1a, 1b of a multirotor wind turbine 100 according to a second embodiment of the invention. The multirotor wind turbine 100 of FIGS. 5 and 6 is very similar to the multirotor wind turbine 100 of FIGS. 1-4, and it will therefore not be described in further detail here.

FIG. 5 illustrates the tower structure 2 with two load carrying structures 3, together with two components 1a and 1b. The components 1a and 1b are arranged in their initial positions near the base 2a of the tower structure 2, and on opposite sides of the tower structure 2. In FIGS. 5 and 6 the components 1a, 1b are in the form of a nacelle 9, without a rotor and wind turbine blades. The component 1a is connected to a first hoisting mechanism (not shown) arranged at or near the connection point, i.e. the first end 4 of one of the load carrying structures 3a, via a first wire 12a. The component 1a is further connected to a second hoisting mechanism (not shown) arranged near the free end 5a of the load carrying structure 3a, via a second wire 13a. The component 1b is connected to hoisting mechanisms at the load carrying structure 3b, in the same manner as the component 1a, via a first wire 12b and a second wire 13b. Accordingly, the situation illustrated in FIG. 5 is similar to the situation illustrated in FIG. 1, except that two components 1a, 1b instead of one component are ready to be lifted.

The components 1a and 1b are now simultaneously hoisted from the initial position by appropriately operating the first and second hoisting mechanisms. In FIG. 6, the hoisting mechanisms are being operated, and the components 1a and 1b are in the process of being lifted from the initial position illustrated in FIG. 5 towards the operating position on the load carrying structures 3a and 3b. The first and/or second hoisting mechanisms may comprise a winch which is operated in such a way that a pull provided by the winch of the first hoisting mechanism is decreasing while a pull provided by the winch of the second hoisting mechanism is increasing during the hoisting of the component 1a. Typically, the hoisting mechanisms are operated simultaneously so that both components introduce similar loads on the wind turbine. In this manner the tower structure is balanced, having same loads on two opposite sides.

Further, by operating the hoisting mechanisms, the components 1a, 1b are subsequently mounted at the respective operating positions, similar to as it is illustrated by FIG. 3. The operating positions are at or near the free ends 5a and 5b of the load carrying structures 3a and 3b, respectively. Additionally, rotors, rotor blades and any other part of the energy generating unit may subsequently be lifted and mounted on the nacelles, similar to the situation illustrated in FIG. 4.

The invention claimed is:

1. A method for lifting a component of a multirotor wind turbine from an initial position to an operating position, the multirotor wind turbine comprising a tower structure and at least one load carrying structure being arranged for carrying at least one energy generating unit and for being connected to the tower structure, the at least one load carrying structure extending away from the tower structure, the method comprising the steps of:
   positioning the component at the initial position near a base of the tower structure,
   providing a first hoisting mechanism at or near a connecting point between the tower structure and the at least one load carrying structure,
   providing a second hoisting mechanism at or near the operating position for the component, the operating position being arranged on the at least one load carrying structure at a distance from the tower structure,
   operating the first hoisting mechanism and the second hoisting mechanism in such a manner that the component is moved from the initial position to the operating position along a predetermined path, and
   mounting the component on the at least one load carrying structure at the operating position.

2. The method according to claim 1, wherein the component is or forms part of the at least one energy generating unit.

3. The method according to claim 1, wherein the operating position is arranged at or near a free end of the at least one load carrying structure.

4. The method according to claim 1, wherein the step of operating the first hoisting mechanism and the second hoisting mechanism comprises decreasing a pull provided by the first hoisting mechanism and increasing a pull provided by the second hoisting mechanism during the hoisting of the component.

5. The method according to claim 1, wherein at least two components are lifted simultaneously to the operating position on respective load carrying structures arranged on opposite sides of the tower structure.

6. The method according to claim 1, further comprising mounting a wire between the operating position of the at least one load carrying structure and a position on the tower structure at or near the base of the tower structure, prior to the step of operating the first hoisting mechanism and the second hoisting mechanism.

7. The method according to claim 1, wherein the first hoisting mechanism and/or the second hoisting mechanism comprises a winch.

8. The method according to claim 1, wherein the predetermined path extends initially along a vertical direction, from the initial position, and subsequently increasingly along a horizontal direction, towards the operating position.

\* \* \* \* \*